US011250290B2

(12) United States Patent
Okada et al.

(10) Patent No.: US 11,250,290 B2
(45) Date of Patent: Feb. 15, 2022

(54) IMAGE PROCESSING DEVICE AND IMAGE PROCESSING METHOD

(71) Applicant: DENSO TEN Limited, Kobe (JP)

(72) Inventors: Yasutaka Okada, Kobe (JP); Hiroaki Sano, Kobe (JP); Tetsuo Yamamoto, Kobe (JP); Atsushi Yoshihara, Kobe (JP); Jun Kanetake, Kawasaki (JP); Ryo Yoshimura, Fukuoka (JP); Tomoki Shidori, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 16/574,462

(22) Filed: Sep. 18, 2019

(65) Prior Publication Data

US 2020/0193210 A1   Jun. 18, 2020

(30) Foreign Application Priority Data

Dec. 14, 2018 (JP) .............................. JP2018-234797

(51) Int. Cl.
*G06K 9/00* (2006.01)
*G06K 9/44* (2006.01)
*G06K 9/46* (2006.01)

(52) U.S. Cl.
CPC ........... *G06K 9/44* (2013.01); *G06K 9/00812* (2013.01); *G06K 9/4604* (2013.01); *G06K 9/4647* (2013.01)

(58) Field of Classification Search
None
See application file for complete search history.

(56) References Cited

U.S. PATENT DOCUMENTS

| 9,361,529 | B2* | 6/2016 | Ryu .................... G06K 9/00812 |
| 9,536,155 | B2* | 1/2017 | Takemae ................... B60R 1/00 |
| 9,721,460 | B2* | 8/2017 | Takemura .............. G08G 1/165 |
| 10,311,731 | B1* | 6/2019 | Li ........................... G08G 1/146 |
| 10,373,226 | B1* | 8/2019 | Russell .............. G06Q 30/0613 |
| 2002/0087253 | A1 | 7/2002 | Jeon |
| 2003/0128106 | A1 | 7/2003 | Ross |
| 2003/0222983 | A1* | 12/2003 | Nobori ................... H04N 7/181 |
| | | | 348/148 |

(Continued)

FOREIGN PATENT DOCUMENTS

| CN | 203318408 U | 12/2013 |
| CN | 102834309 B | 12/2016 |

(Continued)

OTHER PUBLICATIONS

K Choeychuen, "Available car parking space detection from webcam by using adaptive mixing features," 2012 Ninth International Joint Conference on Computer Science and Software Engineering (JCSSE) (Year: 2012).*

(Continued)

*Primary Examiner* — Soo Shin
(74) *Attorney, Agent, or Firm* — Oliff PLC

(57) ABSTRACT

An image processing device includes: an extraction unit which extracts, from image data taken by shooting a neighborhood of a vehicle, edge points that are to be used for detecting partition lines of a parking frame and whose edge intensity values are larger than an edge threshold value; and a correction unit which corrects the edge threshold value based on a density of the edge points extracted by the extraction unit.

16 Claims, 6 Drawing Sheets

(56) References Cited

U.S. PATENT DOCUMENTS

| | | | |
|---|---|---|---|
| 2004/0254720 A1 | 12/2004 | Tanaka et al. | |
| 2006/0080035 A1* | 4/2006 | Daubert | G06T 17/05 |
| | | | 701/455 |
| 2008/0109120 A1 | 5/2008 | Sawamoto | |
| 2009/0243889 A1 | 10/2009 | Suhr et al. | |
| 2009/0278709 A1 | 11/2009 | Endo et al. | |
| 2010/0049402 A1 | 2/2010 | Tanaka | |
| 2010/0195901 A1 | 8/2010 | Andrus et al. | |
| 2010/0318467 A1 | 12/2010 | Porter et al. | |
| 2011/0006917 A1 | 1/2011 | Taniguchi et al. | |
| 2012/0106802 A1 | 5/2012 | Hsieh et al. | |
| 2013/0027557 A1* | 1/2013 | Hirai | G06K 9/00791 |
| | | | 348/148 |
| 2013/0266188 A1 | 10/2013 | Bulan et al. | |
| 2014/0355822 A1* | 12/2014 | Choi | G06K 9/00812 |
| | | | 382/103 |
| 2015/0254981 A1 | 9/2015 | Tachibana et al. | |
| 2015/0294163 A1 | 10/2015 | Sakamoto | |
| 2015/0317526 A1 | 11/2015 | Muramatsu et al. | |
| 2015/0344028 A1 | 12/2015 | Gieseke et al. | |
| 2016/0039409 A1 | 2/2016 | Hayakawa et al. | |
| 2016/0093214 A1* | 3/2016 | Wu | G08G 1/147 |
| | | | 348/148 |
| 2016/0107689 A1 | 4/2016 | Lee | |
| 2016/0272244 A1 | 9/2016 | Imai et al. | |
| 2016/0304088 A1 | 10/2016 | Barth | |
| 2017/0085790 A1* | 3/2017 | Bohn | H04N 5/247 |
| 2018/0012082 A1 | 1/2018 | Satazoda et al. | |
| 2018/0095474 A1 | 4/2018 | Batur et al. | |
| 2018/0099661 A1 | 4/2018 | Bae et al. | |
| 2018/0162446 A1 | 6/2018 | Mikuriya et al. | |
| 2018/0215413 A1 | 8/2018 | Inagaki | |
| 2018/0307919 A1* | 10/2018 | Hayakawa | G06T 7/60 |
| 2018/0307922 A1 | 10/2018 | Toon et al. | |
| 2018/0345955 A1 | 12/2018 | Kim et al. | |
| 2019/0073902 A1 | 3/2019 | Indoh et al. | |
| 2019/0075255 A1 | 3/2019 | Matsumoto et al. | |
| 2019/0094871 A1 | 3/2019 | Sugano | |
| 2019/0370572 A1 | 12/2019 | Nagpal et al. | |
| 2020/0062242 A1* | 2/2020 | Hayakawa | B60W 30/06 |
| 2020/0074192 A1 | 3/2020 | Ogata et al. | |
| 2020/0104613 A1 | 4/2020 | Hirai | |
| 2020/0117927 A1 | 4/2020 | Oba | |
| 2020/0118310 A1 | 4/2020 | Matsumoto et al. | |
| 2020/0175634 A1 | 6/2020 | Aggarwala et al. | |
| 2020/0193643 A1 | 6/2020 | Hess et al. | |
| 2020/0398827 A1 | 12/2020 | Hara | |
| 2021/0180954 A1 | 6/2021 | Hiyokawa et al. | |

FOREIGN PATENT DOCUMENTS

| | | |
|---|---|---|
| JP | 2003-032669 A | 1/2003 |
| JP | 2005-300294 A | 10/2005 |
| JP | 2009-288867 A | 12/2009 |
| JP | 2012-176641 A | 9/2012 |
| JP | 2012-221375 A | 11/2012 |
| JP | 2013-001366 A | 1/2013 |
| JP | 2014-106731 A | 6/2014 |
| JP | 2014-146182 A | 8/2014 |
| JP | 2015-104982 A | 6/2015 |
| JP | 2015-185138 A | 10/2015 |
| JP | 2015219774 A | 12/2015 |
| JP | 2017-021747 A | 1/2017 |
| JP | 2017-076275 A | 4/2017 |
| JP | 2017-087758 A | 5/2017 |
| JP | 2018-136695 A | 8/2018 |
| JP | 2018-180941 A | 11/2018 |
| KR | 1020170102192 A | 9/2017 |
| WO | 03058163 A1 | 7/2003 |
| WO | WO-2005081941 A2 * | 9/2005 ........... G06K 9/4604 |
| WO | 2010116922 A1 | 10/2010 |
| WO | 2014/084118 A1 | 6/2014 |
| WO | 2017/068699 A1 | 4/2017 |

OTHER PUBLICATIONS

Aug. 3, 2020 Office Action issued in U.S. Appl. No. 16/574,598.
Jun. 30, 2020 Notice of Allowance issued in U.S. Appl. No. 16/574,546.
U.S. Appl. No. 16/574,395, filed Sep. 18, 2019 in the name of Yasutaka Okada et al.
U.S. Appl. No. 16/574,507, filed Sep. 18, 2019 in the name of Yasutaka Okada et al.
U.S. Appl. No. 16/574,422, filed Sep. 18, 2019 in the name of Yasutaka Okada et al.
U.S. Appl. No. 16/574,598, filed Sep. 18, 2019 in the name of Yasutaka Okada et al.
U.S. Appl. No. 16/574,503, filed Sep. 18, 2019 in the name of Yasutaka Okada et al.
U.S. Appl. No. 16/574,499, filed Sep. 18, 2019 in the name of Yasutaka Okada et al.
U.S. Appl. No. 16/574,529, filed Sep. 18, 2019 in the name of Yasutaka Okada et al.
U.S. Appl. No. 16/574,546, filed Sep. 18, 2019 in the name of Yasutaka Okada et al.
U.S. Appl. No. 16/574,393, filed Sep. 18, 2019 in the name of Yasutaka Okada et al.
U.S. Appl. No. 16/574,391, filed Sep. 18, 2019 in the name of Yasutaka Okada et al.
U.S. Appl. No. 16/574,450, filed Sep. 18, 2019 in the name of Yasutaka Okada et al.
U.S. Appl. No. 16/574,516, filed Sep. 18, 2019 in the name of Yasutaka Okada et al.
Sep. 29, 2020 Office Action issued in U.S. Appl. No. 16/574,391.
Sep. 2, 2020 Corrected Notice of Allowability issued in U.S. Appl. No. 16/574,546.
Reinhard et al.. Photographic Tone Reproduction for Digital Images (2002), ACM Transactions on Graphics, 2, 4, 217-236 (Year: 2002).
Feb. 2, 2021 Office Action issued in U.S. Appl. No. 16/574,422.
Nov. 12, 2020 Notice of Allowance issued in U.S. Appl. No. 16/574,598.
Dec. 3, 2020 Office Action issued in U.S. Appl. No. 16/574,393.
Nov. 30, 2020 Office Action issued in U.S. Appl. No. 16/574,503.
Suhr et al., "Automatic Parking Space Detection and Tracking for Underground and Indoor Environments." IEEE Transactions on Industrial Electronics. (Year: 2016).
K Hamada et al., "Surround View Based Parking Lot Detection and Tracking." IEEE Intelligent Vehicles Symposium (Year 2015) pp. 1106-1111.
J Suhr et al., "A Universal Vacant Parking Slot Recognition System Using Sensors Mounted on Off-the-Shelf Vehicles." (Year 2018).
May 19, 2021 Office Action issued in U.S. Appl. No. 16/574,395.
May 12, 2021 Notice of Allowance issued in U.S. Appl. No. 16/574,422.
Mar. 30, 2021 Office Action issued in U.S. Appl. No. 16/574,516.
Apr. 6, 2021 Office Action issued in U.S. Appl. No. 16/574,507.
Mar. 19, 2021 Office Action issued in U.S. Appl. No. 16/574,503.
Mar. 25, 2021 Office Action issued in U.S. Appl. No. 16/574,391.
Apr. 9, 2021 Office Action issued in U.S. Appl. No. 16/574,393.
Jul. 20, 2021 Notice of Allowance issued in U.S. Appl. No. 16/574,507.
Dec. 21, 2021 Office Action issued in U.S. Appl. No. 16/574,529.

* cited by examiner

IMAGE PROCESSING DEVICE AND IMAGE PROCESSING METHOD

CROSS-REFERENCE TO RELATED APPLICATIONS

This application is based on and claims priority under 35 USC 119 from Japanese Patent Application No. 2018-234797 filed on Dec. 14, 2018.

TECHNICAL FIELD

The present invention relates to an image processing device and an image processing method.

BACKGROUND ART

In recent years, with the development of autonomous drive techniques, image processing devices for detecting a parking frame in which to park a vehicle on the basis of image data taken by shooting a neighborhood of the vehicle have been coming into wide use. Image processing devices of this type extract edge points whose edge intensity values exceed a threshold value on the basis of image data and detect a parking frame on the basis of the extracted edge points (refer to JP-A-2017-87758, for example).

SUMMARY OF INVENTION

However, in the conventional technique, the processing load is much increased if, for example, an enormous amount of edge points is extracted depending on a load surface state or the like. On the other hand, if the threshold value for the edge intensity is set large, there may occur a case that necessary edge points cannot be extracted.

The present invention has been made in view of the above circumstances, and an object of the invention is therefore to provide an image processing device and an image processing method capable of extracting edge points properly.

The image processing device according to the embodiment is equipped with an extraction unit and a correction unit. The extraction unit extracts, from image data taken by shooting a neighborhood of a vehicle, edge points that are to be used for detecting partition lines of a parking frame and whose edge intensity values are larger than an edge threshold value. The correction unit corrects the edge threshold value on the basis of a density of the edge points extracted by the extraction unit.

The invention makes it possible to extract edge points properly.

DETAILED DESCRIPTION OF THE INVENTION

An image processing device 1 and an image processing method according to an embodiment will be hereinafter described in detail with reference to the accompanying drawings. The present invention is not limited by the embodiment.

Figure 1A:
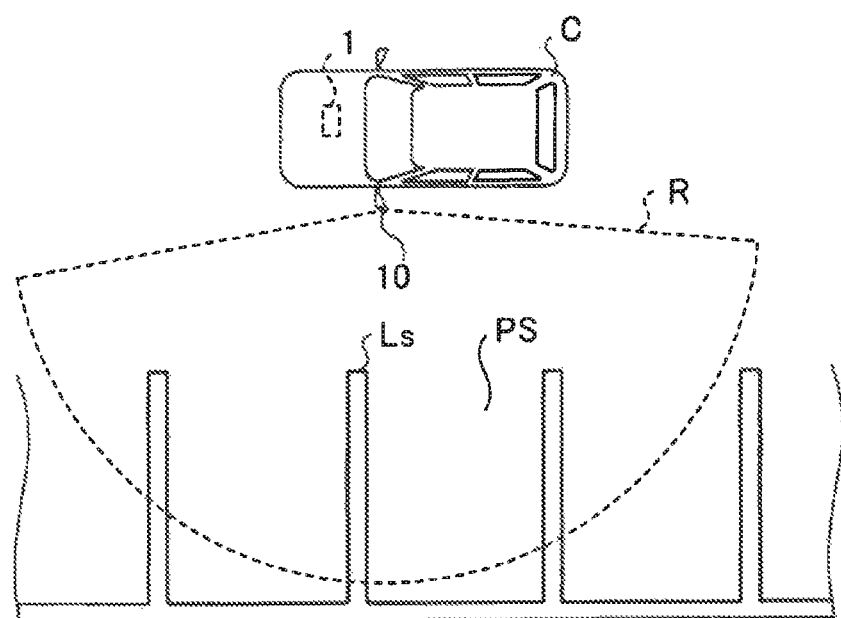
FIG. 1A shows an example manner of installation of an image processing device according to an embodiment.
Figure 1B:
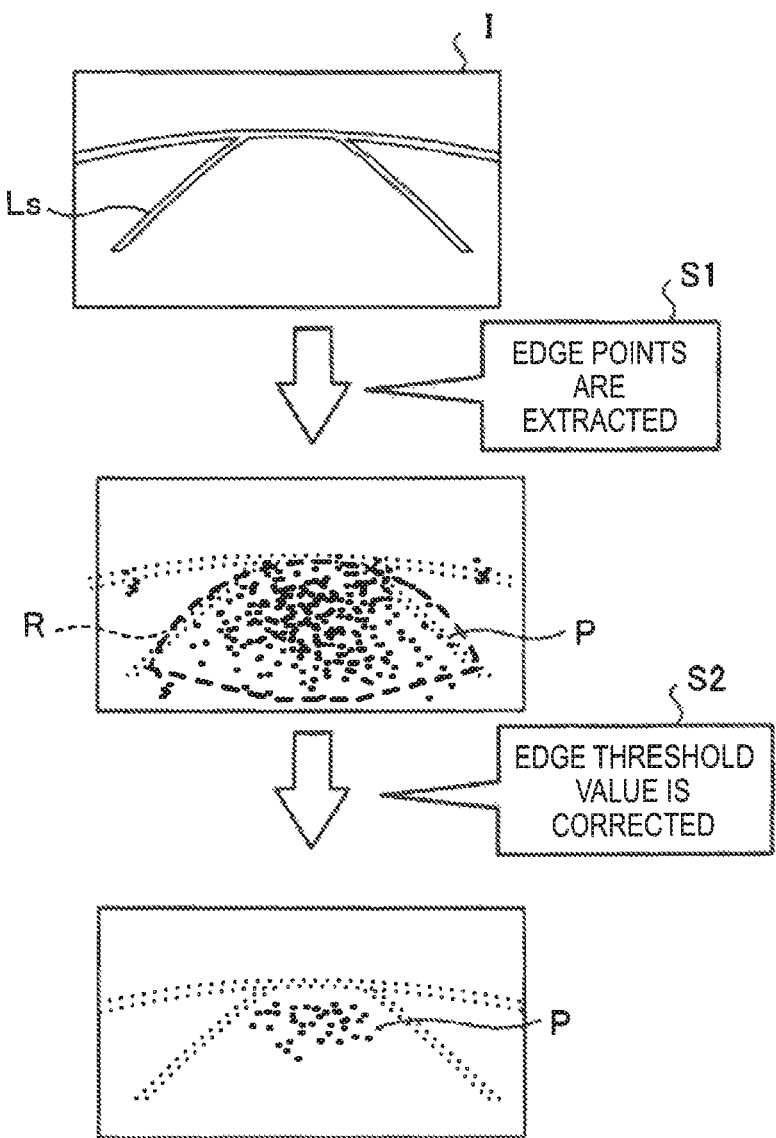
FIG. 1B outlines an image processing method according to the embodiment.

First, the image processing device 1 according to the embodiment will be outlined with reference to FIGS. 1A and 1B. FIG. 1A shows an example manner of installation of the image processing device 1 and FIG. 1B outlines the image processing method. The image processing method is performed by the image processing device 1 shown in FIG. 1A.

As shown in FIG. 1A, the image processing device 1 is installed in a vehicle C and detects a parking frame PS on the basis of imaging data taken by a vehicular camera 10.

Equipped with an imaging device such as a CCD (charge-coupled device) or a CMOS (complementary metal-oxide-semiconductor) sensor, each vehicular camera 10 shoots a neighborhood of the vehicle C. The lens system of each vehicular camera 10 employs a wide-angle lens such as a fisheye lens and has an imaging range R as shown in FIG. 1A.

Although in the example of FIG. 1A the vehicular camera 10 is a left side camera for shooting a left side area around the vehicle C, plural vehicular cameras 10 are installed which include a front camera for shooting an area in front of the vehicle C, a rear camera for shooting an area in the rear of the vehicle C, and a right side camera for shooting a right side of the vehicle C.

Incidentally, the image processing device 1 extracts edge points whose edge intensity is larger than an edge threshold value from image data, detects partition lines Ls that partition a parking frame PS on the basis of the extracted edge points, and detects the parking frame PS on the basis of the detected partition lines Ls.

However, for example, in a certain road surface state, a roughness or the like of a road surface may be extracted as edge points in addition to partition lines Ls. In other words, unnecessary edge points other than those constituting partition lines Ls may be extracted. In such a case, the processing load increases according to the number of edge points extracted. On the other hand, if the edge threshold value is set large, part of the edge points corresponding to partition lines Ls may not be detected. In particular, in image data taken in a dark scene, the luminance difference between each partition line Ls and its neighborhood are small, possibly resulting in a problem that edge lines corresponding to the partition lines Ls cannot be detected.

In view of the above, in the image processing method according to the embodiment, the edge threshold value is set dynamically paying attention to the fact that the edge intensity values of pixels corresponding to a partition line Ls are larger than those of pixels of a neighborhood of the partition line Ls. That is, in the image processing method according to the embodiment, by setting the edge threshold value dynamically, edge points corresponding to each partition line Ls are extracted while unnecessary edge points are eliminated.

More specifically, as shown in FIG. 1B, first, at step S1, the image processing device 1 extracts edge points from image data I. For example, the image processing device 1 obtains edge intensity of each of pixels included in the image data I by converting the image data I into a grayscale image and subjecting it to prescribed edge processing. Then the image processing device 1 extracts, as edge points P, pixels whose edge intensity values exceed a prescribed edge threshold value.

At step S2, the image processing device 1 corrects the edge threshold value according to the density of the edge points P extracted at step S1. More specifically, the image processing device 1 corrects the edge threshold value on the basis of a density (hereinafter referred to as an "edge density") of edge points in a target region R where the resolution of image data of a road surface is relatively high in the image data I.

The target region R is a road surface region that is relatively close to the vehicle C and in which the resolution of image data taken is high. In other words, the target region R is a region where edge points corresponding to a roughness of a road surface tend to be extracted, and is set at a bottom-center position of an image.

The image processing device 1 corrects the edge threshold value so that the edge density in the target region R becomes a prescribed value. That is, the image processing device 1 corrects the edge threshold value upward if the edge density is higher than the prescribed value, and downward if the edge density is lower than or equal to the prescribed value In other words, the image processing device 1 corrects the edge threshold value so that pixels whose edge intensity values account for upper N % in the target region R are extracted as edge points P. The image processing device 1 extracts edge points P again on the basis of the corrected edge threshold value.

As a result, the image processing device 1 according to the embodiment can extract edge points P corresponding to partition lines Ls while suppressing extraction of unnecessary edge points P. That is, the image processing device 1 can extract edge points P properly. The image processing device 1 may use the corrected edge threshold value from either a current frame or the next frame.

Figure 2:
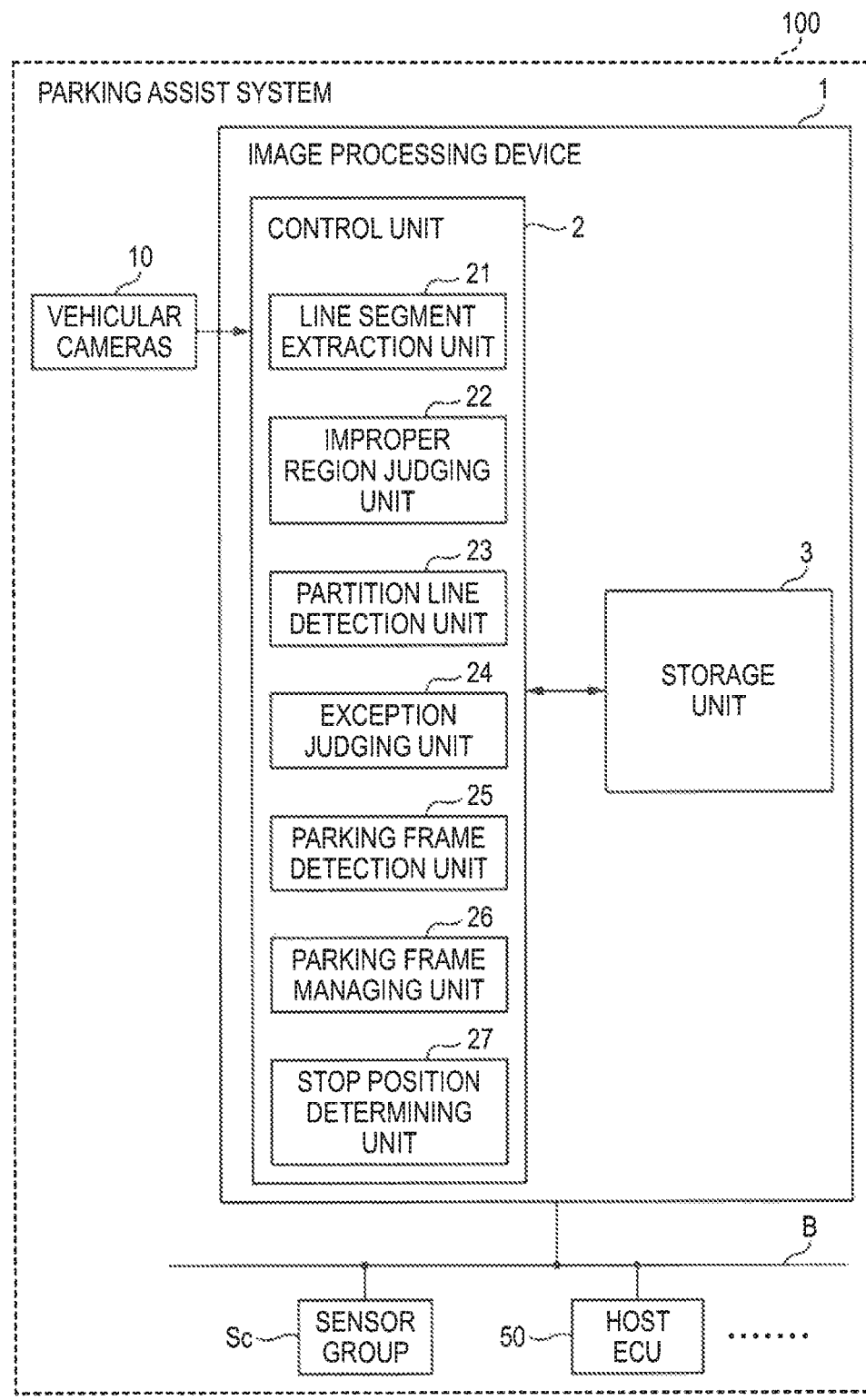
FIG. 2 is a block diagram of a parking support system including the image processing device according to the embodiment.

Next, an example configuration of the image processing device 1 according to the embodiment will be described with reference to FIG. 2. FIG. 2 is a block diagram of a parking assist system 100 including the image processing device 1. As shown in FIG. 2, the parking assist system 100 is equipped with the image processing device 1, vehicular cameras 10, a sensor group Sc, and a host ECU (electronic control unit) 50. As shown in FIG. 2, the image processing device 1, the sensor group Sc, and the host ECU 50 can communicate with each other via a communication bus B of the communication standard of CAN (Control Area Network) communication.

The sensor group Sc, which consists of various kinds of sensors for detecting a running state of the vehicle C, communicates detected sensor values to the image processing device 1. The sensor group Sc includes a vehicle speed sensor for detecting a rotation speed of wheels of the vehicle C, a steering angle sensor for detecting a steering angle of the vehicle C, etc.

The host ECU 50, which is, for example, a CPU for assisting automatic parking of the vehicle C, parks the vehicle C in a parking frame PS detected by the image processing device 1. Being, for example, an EPS (electric power steering)-ECU for controlling the steering angle of the vehicle C, the host ECU 50 can control the steering angle so that the vehicle C is parked in a parking frame PS detected by the image processing device 1. The host ECU 50 may include ECUs for accelerator control and braking control.

As shown in FIG. 2, the image processing device 1 is equipped with a control unit 2 and a storage unit 3. The control unit 2 is equipped with a line segment extraction unit 21, an improper region judging unit 22, a partition line detection unit 23, an exception judging unit 24, a parking frame detection unit 25, a parking frame managing unit 26, and a stop position determining unit 27.

For example, the control unit 2 includes a computer having a CPU (central processing unit), a ROM (read-only memory), a RAM (random access memory), an HDD (hard disk drive), an input/output port, etc., and other various kinds of circuits.

For example, the CPU of the computer functions as the line segment extraction unit 21, the improper region judging unit 22, the partition line detection unit 23, the exception judging unit 24, the parking frame detection unit 25, the parking frame managing unit 26, and the stop position determining unit 27 by reading out programs stored in the ROM and running them.

All or part of the line segment extraction unit 21, the improper region judging unit 22, the partition line detection unit 23, the exception judging unit 24, the parking frame detection unit 25, the parking frame managing unit 26, and the stop position determining unit 27 can be implemented as hardware such as an ASIC (application-specific integrated circuit) or an FPGA (field-programmable gate array).

For example, the storage unit 3 corresponds to the RAM and the HDD. The RAM and the HDD can store various kinds of information and the information of various kinds of programs. The image processing device 1 may be configured so as to acquire the various kinds of information and programs from a portable recording medium or another computer that is connected to it by wire or wirelessly via a network.

For example, the control unit 2 may execute a parking frame detection process (described later) either in the case where the vehicle C is considered to be running in a parking lot (e.g., the vehicle speed is lower than or equal to 30 km/h) or during all the period when the vehicle C is running.

The line segment extraction unit 21 detects edge lines each of which is a line connecting edge points on the basis of the luminance of each of pixels of image data that is input from a vehicular camera 10. More specifically, the line segment extraction unit 21 converts the image data received from the vehicular camera 10 into a grayscale image. Grayscaling is processing of converting the value of each pixel of image data into one of prescribed gradation levels of white to black (e.g., 256 gradation levels) according to its luminance.

Then the line segment extraction unit 21 determines edge intensity and a luminance gradient of each pixel by, for example, applying a Sobel filter to the grayscale image. Then the line segment extraction unit 21 extracts edge points by extracting pixels whose edge intensity values exceed an edge threshold value and extracts edge lines by connecting adjoining edge points. The line segment extraction unit 21 communicates edge information relating to the extracted edge points and edge lines to the improper region judging unit 22. A specific example of the internal configuration of the line segment extraction unit 21 will be described later with reference to FIG. 3.

The improper region judging unit 22 judges, on the basis of the edge points and edge lines extracted by the line segment extraction unit 21, presence/absence of an improper region where detection of a partition line to constitute a parking frame is difficult. For example, the improper region judging unit 22 determines, as an improper region, an unpaved road surface region (e.g., graveled region) and a grating region where more edge points are detected than in a paved road surface.

More specifically, the improper region judging unit 22 can judge, as an improper region, a region where the density of edge points is higher than a prescribed value or the luminance gradient of edge points is not uniform. The improper region judging unit 22 eliminates edge information of the improper region from the above-mentioned edge information on the basis of the thus-determined improper region and gives resulting information to the downstream stage.

The partition line detection unit 23 detects partition line candidates, that is, candidates for partition lines to partition a parking frame, on the basis of the edge lines extracted by the line segment extraction unit 21. More specifically, the partition line detection unit 23 detects, as a partition line candidate, edge lines that are approximately parallel with each other and whose interval is within a prescribed range corresponding to the width of partition lines.

That is, the partition line detection unit 23 detects, as a partition line candidate, edge lines to correspond to left and right end lines of a partition line in its width direction. The partition line detection unit 23 generates partition line information relating to the detected partition line candidates and communicates the generated partition line information to the exception judging unit 24.

The partition line detection unit 23 can perform the processing of detecting partition line candidates in such a manner as to eliminate the improper region detected by the improper region judging unit 22. In other words, the partition line detection unit 23 does not perform the partition line candidate detection processing for the improper region. This makes it possible to reduce the processing load of the control unit 2.

The exception judging unit 24 judges presence/absence of a parking prohibition region where parking of the vehicle C is not permitted, on the basis of the partition line candidates detected by the partition line detection unit 23. For example, the exception judging unit 24 judges presence/absence of a parking prohibition region such as a zebra zone (vehicle guiding zone).

More specifically, where it is assumed that partition line candidates that approximately parallel with each other are partition lines (called "base partition lines"), the exception judging unit 24 judges that the region interposed between the base partition lines is a parking prohibition region (zebra zone) if three or more partition line candidates that are inclined with respect to the base partition lines exist at prescribed intervals.

The exception judging unit 24 can judge presence/absence of a partition line candidate(s) that is not necessary for detection of a parking frame, such as (part of) a road surface marking. For example, the exception judging unit 24 can detect a road surface marking contained in image data by matching partition line candidates detected by the partition line detection unit 23 with template models of road surface markings.

The exception judging unit 24 eliminates unnecessary partition line candidates from the partition line information, adds information indicating the parking prohibition region to the partition line information, and communicates the resulting partition line information to the parking frame detection unit 25.

The parking frame detection unit 25 detects a parking frame on the basis of the partition line candidates detected by the partition line detection unit 23. More specifically, the parking frame detection unit 25 detects, as part of a parking frame, partition line candidates that are arranged parallel with each other with a prescribed interval.

The prescribed interval is a width of a standard parking region for common or public use that is prescribed in, for example, a law relating to parking lots. At this time, the parking frame detection unit 25 detects a parking frame so as to exclude the parking prohibition region determined by the exception judging unit 24.

That is, the parking frame detection unit 25 detects a parking frame so as to exclude a zebra zone or the like. Upon detecting the parking frame, the parking frame detection unit 25 communicates parking frame information relating to the detected parking frame to the parking frame managing unit 26. In the following, the partition line candidates detected as constituting a parking frame will be referred to as "partition lines." Each piece of partition line information includes apex coordinates of each partition line with reference to the vehicle C.

The parking frame managing unit 26 manages, in time series, the partition frame information of the parking frame detected by the parking frame detection unit 25. The parking frame managing unit 26 can estimate a movement distance of the vehicle C on the basis of sensor values received from the sensor group Sc and estimate apex coordinates of current apex coordinates of each partition line on the basis of the movement distance and past partition frame information.

Furthermore, the parking frame managing unit 26 can update the coordinate information of each partition line of past partition frame information on the basis of newly received partition frame information. That is, the parking frame managing unit 26 updates the relative positional relationship between the vehicle C and the parking frame at such occasions as the vehicle C moves.

Still further, it is also possible for the parking frame managing unit 26 to set a parking frame detection range with an assumption that plural parking frames are arranged continuously. For example, the parking frame managing unit 26 assumes that plural parking frames exist continuously including one parking frame (reference parking frame) detected by the parking frame detection unit 25.

And the parking frame managing unit 26 sets the thus-assumed range of the plural parking frames as a detection range. With this measure, it suffices for the above-described line segment extraction unit 21 to perform edge line detection processing only for the detection range set by the parking frame managing unit 26, whereby the processing load of the control unit 2 can be reduced.

The stop position determining unit 27 determines a stop position of the vehicle C, that is, a parking position in the parking frame, on the basis of the edge lines detected by the line segment extraction unit 21. For example, the stop position determining unit 27 determines a stop position of the vehicle C by detecting a sprag(s) or curb, a wall, a white line extending in the vehicle width direction, etc. on the basis of the edge lines detected by the line segment extraction unit 21. That is, the stop position determining unit 27 determines a stop position on the basis of a partition line or a sprag located at deep position in the parking frame PS and extending in the width direction of the vehicle C.

When detecting a sprag, the stop position determining unit 27 determines a stop position so that the bottom portions of the rear wheels of the vehicle C will be located just in front of the sprag. When detecting a white line, a wall, or the like rather than a sprag, the stop position determining unit 27 determines a stop position so that the rear end (e.g., the end of the rear bumper) will be located just in front of it.

Figure 3:
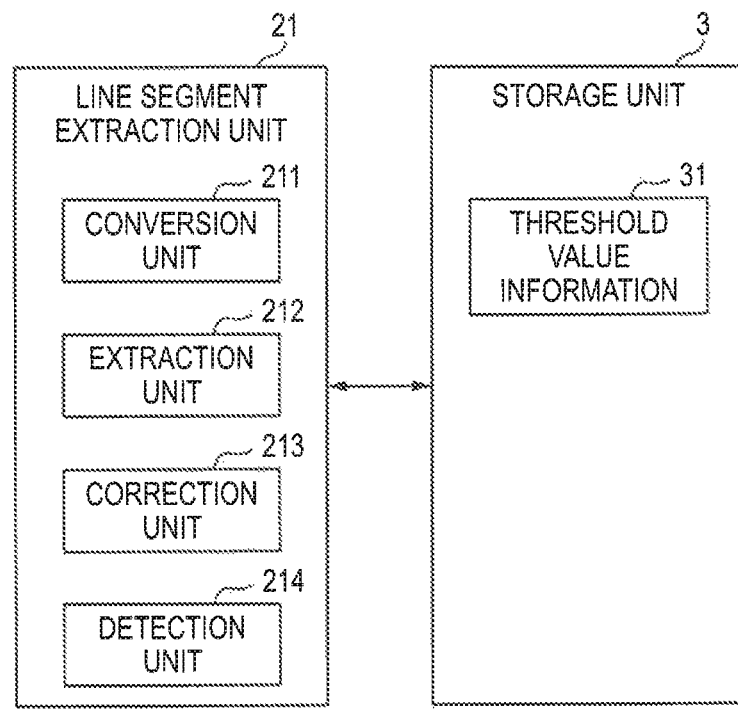
FIG. 3 is a block diagram of a line segment extraction unit.

Next, an example configuration of the line segment extraction unit 21 will be described with reference to FIG. 3. FIG. 3 is a block diagram of the line segment extraction unit 21. As shown in FIG. 3, the line segment extraction unit 21 is equipped with a conversion unit 211, an extraction unit 212, a correction unit 213, and a detection unit 214. The line segment extraction unit 21 extracts edge lines and the storage unit 3 stores threshold value information 31.

The threshold value information 31 is information relating to an edge threshold value. For example, the threshold value information 31 is information relating to a default edge threshold value and an edge threshold value corrected by the correction unit 213 (described later).

The conversion unit 211 converts image data I received from a vehicular camera 10 into a grayscale image. The conversion unit 211 determines edge intensity and a luminance gradient of each pixel of the image data I by performing edge processing on the grayscale image. The conversion unit 211 generates edge information relating to the edge intensity and the luminance gradient of each pixel and passes it to the extraction unit 212.

The extraction unit 212 extracts, as edge points P, pixels whose edge intensity values exceed the edge threshold value and passes information relating to the edge points P to the correction unit 213. For example, the extraction unit 212 extracts edge points P using the default edge threshold value which is included in the threshold value information 31. Furthermore, when the edge threshold value has been corrected by the correction unit 213, the extraction unit 212 extracts edge points P again using the corrected edge threshold value.

The correction unit 213 corrects the edge threshold value on the basis of a density of edge points P extracted by the extraction unit 212 and communicates the corrected edge threshold value to the extraction unit 212. In response, the extraction unit 212 extracts edge points P again using the corrected edge threshold value.

The correction unit 213 corrects the edge threshold value on the basis of an edge density of edge points P extracted in a target region R as shown in FIG. 1B. That is, the correction unit 213 corrects the edge threshold value using the edge density in the target region R as an index.

With the above processing, the edge threshold value can be corrected to a proper value. As described above, the target region R is a road surface region where the resolution of is relatively high in the image data I. Where the edge density in the target region R is high, it means that a relatively large number of edge points P have been extracted from the image data I and unnecessary edge points P have also been extracted.

On the other hand, where the edge density in the target region R is low, it means that edge points corresponding to partition lines Ls are not extracted. Thus, the correction unit 213's correcting the edge threshold value on the basis of the edge density in the target region R makes it possible to eliminate edge points P corresponding to a road surface roughness properly. The correction unit 213 may correct the edge threshold value on the basis of an edge density in the entire image data I without employing the target region R.

Figure 4:
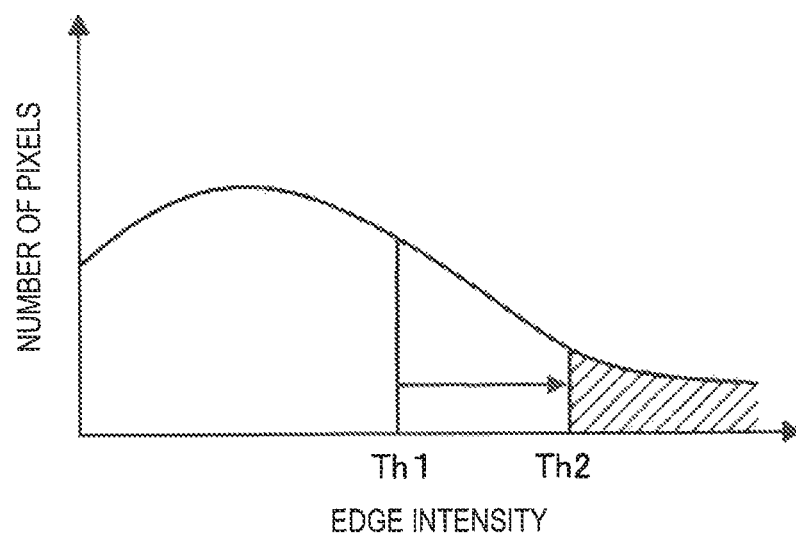
FIG. 4 is a graph showing a specific example of an edge threshold value.

Next, a specific example of the edge threshold value to be corrected by the correction unit 213 will be described with reference to FIG. 4. FIG. 4 is a graph showing a specific example of the edge threshold value. In FIG. 4, the vertical axis represents the number of pixels and the horizontal axis represents the edge intensity.

As shown in FIG. 4, the correction unit 213 generates a histogram and corrects the edge threshold value on the basis of the generated histogram. More specifically, if the edge density of edge points P extracted in the target region R using an edge threshold value Th1 is higher than a prescribed value, the correction unit 213 corrects the edge threshold value Th1 to an edge threshold value Th2 that is larger than the edge threshold value Th1.

At this time, the correction unit 213 sets the edge threshold value Th2 at such a value that only pixels whose edge intensity values account for upper N % of the histogram are extracted. Edge points P corresponding to a roughness of a road surface have edge intensity values that are smaller than those of partition lines Ls do. Thus, where the image data I includes data corresponding to partition lines Ls, it is expected that edge points P corresponding to the partition line Ls account for a majority of the upper N %.

As such, the correction unit 213 can suppress extraction of edge points P corresponding to a roughness of a road surface by correcting the edge threshold value so that only pixels whose edge intensity values account for upper N % are extracted as edge points P. In other words, the correction unit 213 enables efficient extraction of edge points P corresponding to partition lines Ls.

Whereas in the above description the correction unit 213 corrects the edge threshold value to a larger value, the correction unit 213 may correct the edge threshold value to a smaller value. For example, where the edge density in the target region R is lower than a prescribed value, the correction unit 213 corrects the edge threshold value to a smaller value.

This measure makes it possible to extract edge points P corresponding to partition lines Ls properly even in a situation that edge points P are difficult to extract as in a dark parking lot. Where the default edge threshold value is set at a sufficiently small value assuming a situation that edge points P are difficult to extract as in a dark parking lot, the correction unit 213 may correct the edge threshold value only when the edge density is higher than a prescribed value.

That is, the correction unit 213 maybe configured so as to correct the edge threshold value only when the edge density is out of a prescribed range and to continue to use the default edge threshold value when the edge density is within the prescribed range. This makes it possible to correct the edge threshold value according to the state of a road surface around the vehicle C.

Returning to FIG. 3, the detection unit 214 will be described. The detection unit 214 detect edge lines by connecting the edge points P extracted by the extraction unit 212. Where edge points P have been extracted again by the extraction unit 212, the detection unit 214 detects edge lines on the basis of the re-extracted edge points P.

In particular, when the edge threshold value is corrected to a larger value, the number of edge points P re-extracted is smaller than that of edge points P extracted before the re-extraction. When the detection unit 214 detect edge lines using re-extracted edge points P, it can detect edge lines on the basis of a smaller number of edge points P, whereby the processing load of the detection of edge lines can be reduced.

Figure 5:
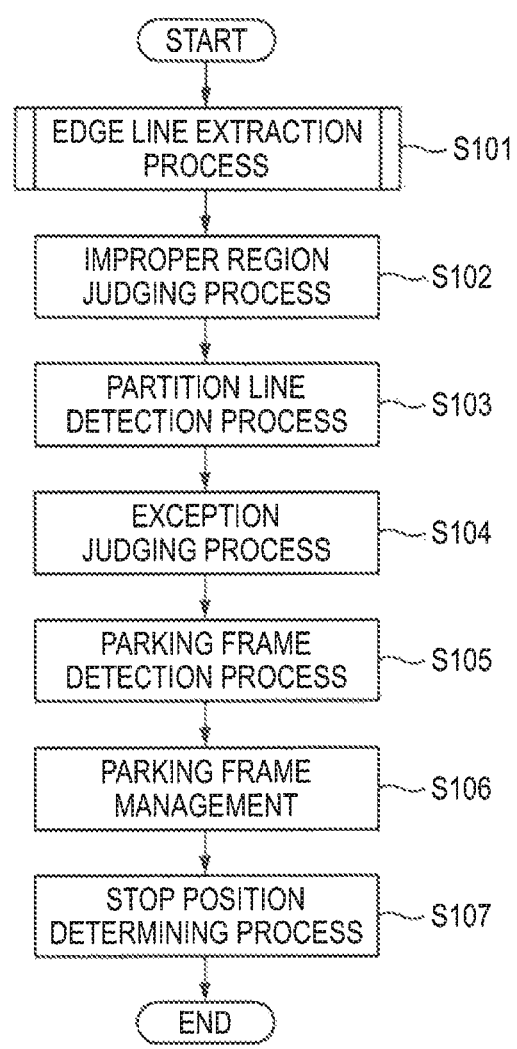
FIG. 5 is a flowchart showing the procedure of a process that is executed by the image processing device according to the embodiment.

Next, the procedure of a process that is executed by the image processing device 1 according to the embodiment will be described with reference to FIG. 5. FIG. 5 is a flowchart showing the procedure of a process that is executed by the image processing device 1. For example, this process is executed by the control unit 2 repeatedly while the vehicle speed of the vehicle C is lower than or equal to a prescribed value (e.g., 30 km/h).

As shown in FIG. 5, first, at step S101, the image processing device 1 executes an edge line extraction process of extracting edge points and edge lines from a grayscale image. At step S102, the image processing device 1 executes an improper region judging process on the basis of processing results of the edge line extraction process.

A specific example of the edge line extraction process will be described later with reference to FIG. 6. At step S103, the image processing device 1 executes a partition line detection process of detecting partition line candidates on the basis of the edge lines extracted at step S101.

At step S104, the image processing device 1 executes an exception judging process of judging presence/absence of a parking prohibition region or the like on the basis of the processing results of steps S101-S103. At step S105, the image processing device 1 executes a parking frame detection process of detecting a parking frame.

At step S106, the image processing device 1 performs parking frame management of managing the parking frame detected at step S105. At step S107, the image processing device 1 executes a stop position determining process of determining a stop position, where to stop the vehicle C, in the parking frame. Then the image processing device 1 finishes the execution of the process shown in FIG. 5.

Next, the procedure of the edge line extraction process (step S101) shown in FIG. 5 will be described with reference to FIG. 6. FIG. 6 is a flowchart showing the procedure of the edge line extraction process shown in FIG. 5.

Figure 6:
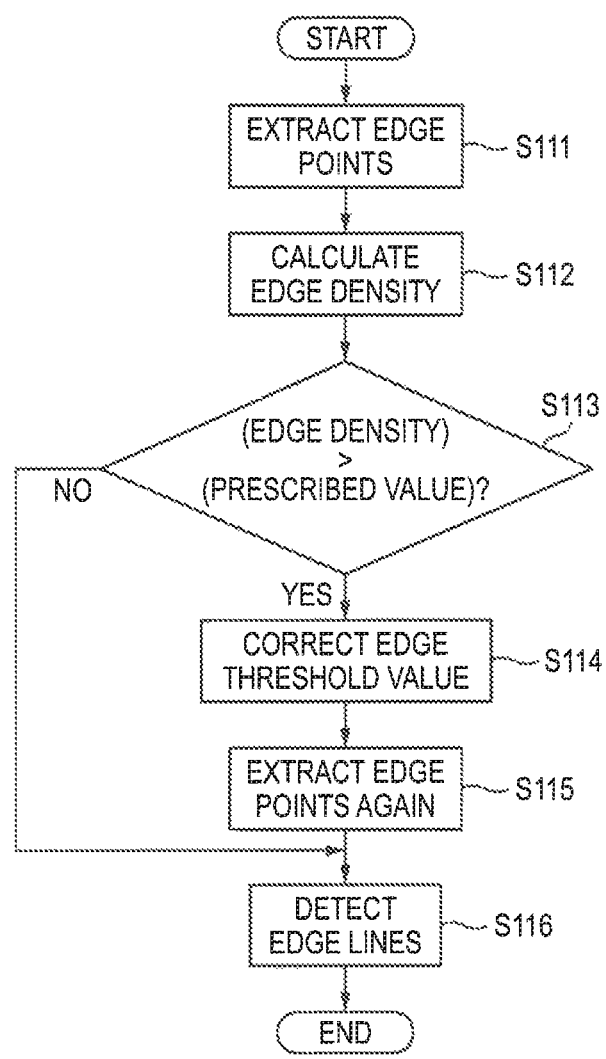
FIG. 6 is a flowchart showing the procedure of an edge line extraction process shown in FIG. 5.

As shown in FIG. 6, first, at step S111, the line segment extraction unit 21 extracts edge points P using the default edge threshold value. At step S112, the line segment extraction unit 21 calculates an edge density in the target region R on the basis of the extracted edge points P.

At step S113, the line segment extraction unit 21 judges whether the edge density is higher than a prescribed value. If the edge density is higher than the prescribed value (S113: yes), at step S114 the line segment extraction unit 21 corrects the edge threshold value.

At step S115, the line segment extraction unit 21 extracts edge points P again using the corrected edge threshold value. At step S116, the line segment extraction unit 21 detects edge lines on the basis of the re-extracted edge points P. Then the line segment extraction unit 21 finishes the execution of the process shown in FIG. 6.

On the other hand, if it is judged at step S113 that the edge density is lower than or equal to the prescribed value (S113: no), the line segment extraction unit 21 executes step S116 using the edge points P that were extracted at step S111.

Although in the process of FIG. 6 is such that the edge threshold value is corrected when the edge density is higher than the prescribed value, the edge threshold value may be corrected when the edge density is lower than a second prescribed value that is smaller than the prescribed value employed in the process of FIG. 6. In this case, the edge threshold value is connected to a smaller value.

As described above, the line segment extraction unit 21 of the image processing device 1 according to the embodiment is equipped with the extraction unit 212 and the correction unit 213. The extraction unit 212 extracts, from image data I taken by shooting a neighborhood of the vehicle C, edge points P that are to be used for detecting partition lines of a parking frame and whose edge intensity values are larger than the edge threshold value. The correction unit 213 corrects the edge threshold value on the basis of a density of edge points P extracted by the extraction unit 212. As a result, the image processing device 1 can extract edge points properly.

Incidentally, the above embodiment is directed to the case that the image processing device 1 acquires pieces of information relating to a running state of the vehicle C from the sensor group Sc (see FIG. 2); however, the invention is not limited to that case. The image processing device 1 may extract optical flow from image data I and estimate a running state of the vehicle C on the basis of the optical flow.

Those skilled in the art could derive further advantages and modifications easily. Thus, broader modes of the invention are not limited to the particular and typical detailed embodiment described above. Various modifications are therefore possible without departing from the spirit and scope of the comprehensive inventive concept that is defined by the accompanying claims and its equivalents.

LIST OF REFERENCE SYMBOLS

1: Image processing device
21: Line segment extraction unit
22: Improper region judging unit
23: Partition line detection unit
24: Exception judging unit
25: Parking frame detection unit
26: Parking frame managing unit
27: Stop position determining unit
31: Threshold information
211: Conversion unit
212: Extraction unit
213: Correction unit
214: Detection unit

What is claimed is:

1. An image processing device comprising:
a computer including a hardware processor configured to function as an extraction unit and a correction unit, wherein
the extraction unit extracts, from image data taken by shooting a neighborhood of a vehicle, edge points that are to be used for detecting partition lines of a parking frame and whose edge intensity values are larger than an edge threshold value; and
the correction unit corrects the edge threshold value only when a density of the edge points extracted by the extraction unit is outside of a prescribed range.

2. The image processing device according to claim 1, wherein the extraction unit extracts edge points again using the edge threshold value that has been corrected by the correction unit and supplies the edge points extracted again to a downstream unit.

3. The image processing device according to claim 1, wherein the correction unit corrects the edge threshold value based on the density of edge points in a target region where a resolution of the image data of a road surface is higher compared to other regions of the image data.

4. The image processing device according to claim 1, wherein the correction unit corrects the edge threshold value so that a number of the edge points extracted by the extraction unit becomes equal to a prescribed number.

5. The image processing device according to claim 1, wherein the density of edge points is a number of the edge points that have been extracted by the extraction unit from all or a portion of the image data.

6. The image processing device according to claim 1, wherein:
the hardware processor is further configured to function as an edge line detection unit, and a parking frame detection unit;

the extraction unit re-extracts edge points from the image data using the edge threshold value that has been corrected by the correction unit when the density of the edge points previously extracted by the extraction unit is outside of the prescribed range, so that the density of the edge points re-extracted using the edge threshold value that has been corrected by the correction unit is within the prescribed range;

the edge line detection unit detects edge lines by connecting either (i) the edge points that have been extracted by the extraction unit when the density of the edge points extracted by the extraction unit is within the prescribed range, or (ii) the edge points that have been re-extracted by the extraction unit when the density of the edge points previously extracted by the extraction unit is outside of the prescribed range; and the parking frame detection unit detects a parking frame based on the edge lines detected by the edge line detection unit and that have been designated as partition line candidates.

7. The image processing device according to claim 2, wherein the correction unit corrects the edge threshold value based on the density of edge points in a target region where a resolution of the image data of a road surface is higher compared to other regions of the image data.

8. The image processing device according to claim 2, wherein the correction unit corrects the edge threshold value so that a number of the edge points extracted by the extraction unit becomes equal to a prescribed number.

9. The image processing device according to claim 3, wherein the correction unit generates a histogram of edge intensity values of respective pixels in the target region and corrects the edge threshold value based on the histogram.

10. The image processing device according to claim 3, wherein the correction unit corrects the edge threshold value so that a number of the edge points extracted by the extraction unit becomes equal to a prescribed number.

11. The image processing device according to claim 7, wherein the correction unit generates a histogram of edge intensity values of respective pixels in the target region and corrects the edge threshold value based on the histogram.

12. The image processing device according to claim 7, wherein the correction unit corrects the edge threshold value so that a number of the edge points extracted by the extraction unit becomes equal to a prescribed number.

13. An image processing method comprising:
extracting, by a computer having a hardware processor, from image data taken by shooting a neighborhood of a vehicle, edge points that are to be used for detecting partition lines of a parking frame and whose edge intensity values are larger than an edge threshold value; and correcting, by the computer having the hardware processor, the edge threshold value only when a density of the extracted edge points is outside of a prescribed range.

14. The image processing method according to claim 13, wherein the density of edge points is a number of the edge points that have been extracted from all or a portion of the image data.

15. The image processing method according to claim 13, further comprising:

re-extracting, by the computer having the hardware processor, edge points from the image data using the edge threshold value that has been corrected by the correcting step when the density of the edge points previously extracted by the extracting step is outside of the prescribed range, so that the density of the edge points re-extracted using the edge threshold value that has been corrected is within the prescribed range;

detecting, by the computer having the hardware processor, edge lines by connecting either (i) the edge points that have been extracted by the extracting step when the density of the edge points extracted by the extracting step is within the prescribed range, or (ii) the edge points that have been re-extracted by the re-extracting step when the density of the edge points previously extracted by the extracting step is outside of the prescribed range; and detecting, by the computer having the hardware processor, a parking frame based on the edge lines that have been detected and that have been designated as partition line candidates.

16. An image processing device comprising:
a computer including a memory and a hardware processor, the memory storing an edge threshold value, the hardware processor configured to function as an extraction unit, a correction unit, an edge line detection unit, and a parking frame detection unit, wherein the extraction unit extracts, from image data taken by shooting a neighborhood of a vehicle, edge points that are to be used for detecting partition lines of a parking frame and whose edge intensity values are larger than the edge threshold value that is stored in the memory;

the correction unit corrects the edge threshold value that is stored in the memory only when a density of the edge points extracted by the extraction unit is outside of a prescribed range, the density of the edge points being a number of the edge points that have been extracted from all or a portion of the image data;

the extraction unit re-extracts edge points from the image data using the edge threshold value that has been corrected by the correction unit when the density of the edge points previously extracted by the extraction unit is outside of the prescribed range, so that the density of the edge points re-extracted using the edge threshold value that has been corrected by the correction unit is within the prescribed range;

the edge line detection unit detects edge lines by connecting either (i) the edge points that have been extracted by the extraction unit when the density of the edge points extracted by the extraction unit is within the prescribed range, or (ii) the edge points that have been re-extracted by the extraction unit when the density of the edge points previously extracted by the extraction unit is outside of the prescribed range; and the parking frame detection unit detects a parking frame based on the edge lines detected by the edge line detection unit and that have been designated as partition line candidates.

* * * * *